US012798218B2

(12) United States Patent
Lin et al.

(10) Patent No.: US 12,798,218 B2
(45) Date of Patent: Nov. 17, 2026

(54) COMPOSITE MULTIFUNCTIONAL GLASS AND VEHICLE GLASS

(71) Applicant: FUYAO GLASS INDUSTRY GROUP CO., LTD., Fuqing (CN)

(72) Inventors: Shou Lin, Fuqing (CN); Shengye Lin, Fuqing (CN)

(73) Assignee: FUYAO GLASS INDUSTRY GROUP CO., LTD., Fuqing (CN)

( * ) Notice: Subject to any disclaimer, the term of this patent is extended or adjusted under 35 U.S.C. 154(b) by 69 days.

(21) Appl. No.: 18/844,683

(22) PCT Filed: Mar. 8, 2023

(86) PCT No.: PCT/CN2023/080255
§ 371 (c)(1),
(2) Date: Sep. 6, 2024

(87) PCT Pub. No.: WO2023/169457
PCT Pub. Date: Sep. 14, 2023

(65) Prior Publication Data

US 2025/0178316 A1 Jun. 5, 2025

(30) Foreign Application Priority Data

Mar. 8, 2022 (CN) ......................... 202210227883.4
Mar. 8, 2022 (CN) ......................... 202220502660.X

(51) Int. Cl.
*B32B 17/10* (2006.01)
*B32B 1/00* (2024.01)
*B32B 3/08* (2006.01)

(52) U.S. Cl.
CPC .......... *B32B 17/10036* (2013.01); *B32B 1/00* (2013.01); *B32B 3/08* (2013.01);
(Continued)

(58) Field of Classification Search
None
See application file for complete search history.

(56) References Cited

U.S. PATENT DOCUMENTS

2006/0144090 A1 7/2006 Yoshizawa
2015/0101736 A1 4/2015 Izutani et al.
(Continued)

FOREIGN PATENT DOCUMENTS

CN 1726172 A 1/2006
CN 104395072 A 3/2015
(Continued)

OTHER PUBLICATIONS

Extended European Search Report issued on May 23, 2025 for counterpart European patent application No. 23766034.5 (7 pages).
(Continued)

*Primary Examiner* — Laura C Powers
(74) *Attorney, Agent, or Firm* — Nutter McClennen & Fish LLP

(57) ABSTRACT

The present invention provides composite multifunctional glass and vehicle glass. The composite multifunctional glass comprises a first glass plate, a first adhesive film layer, a composite multifunctional combined layer, a third adhesive film layer and a second glass plate which are sequentially stacked. The area S1 of the composite multifunctional combined layer is smaller than the area S2 of the composite multifunctional glass, and gaps are formed in the periphery of the composite multifunctional combined layer; a second adhesive film layer having a thickness of H3 is provided in the gaps in a manner of being adjacent to the peripheral tangent plane of the composite multifunctional combined layer; the thickness of the second adhesive film may be higher than, lower than or equal to the thickness of the composite multifunctional combined layer according to different conditions. According to the present invention, the
(Continued)

problem that wrinkles or wave phenomena generally exist between the existing composite multifunctional layer interlayer and a hyperbolic glass plate can be well solved, a finished product rate of an assembly product is improved, and the problem of increasing edge cracking of the composite multifunctional layer glass product is solved.

15 Claims, 3 Drawing Sheets

(52) U.S. Cl.
CPC .... *B32B 17/1055* (2013.01); *B32B 17/10788* (2013.01); *B32B 2250/44* (2013.01); *B32B 2307/7376* (2023.05); *B32B 2551/00* (2013.01); *B32B 2605/00* (2013.01)

(56) References Cited

U.S. PATENT DOCUMENTS

2015/0165728 A1 6/2015 Legrand et al.
2016/0312523 A1* 10/2016 Miyasaka ......... B32B 17/10165
2020/0055284 A1 2/2020 Kizmaz et al.
2020/0376815 A1 12/2020 Mannheim Astete et al.
2021/0008842 A1 1/2021 Klein et al.
2021/0078304 A1 3/2021 Yoon et al.
2021/0208445 A1 7/2021 Ikezawa et al.
2021/0362477 A1 11/2021 Gima
2022/0063401 A1 3/2022 Aoki et al.
2022/0072828 A1 3/2022 Zhang et al.
2024/0075714 A1 3/2024 Van Der Meulen et al.

FOREIGN PATENT DOCUMENTS

CN 107263964 A 10/2017
CN 108367545 A 8/2018
CN 110958940 A 4/2020
CN 111247111 A 6/2020
CN 111670115 A 9/2020
CN 111867827 A 10/2020
CN 108367545 B 7/2021
CN 113165370 A 7/2021
CN 113412246 A 9/2021
CN 114536890 A 5/2022
CN 216993379 U 7/2022
DE 102016013680 A1 5/2018
EP 2218698 B1 8/2012
JP H0393124 U 9/1991
JP 2012162427 A 8/2012
JP 2019535618 A 12/2019
JP 2020007182 A 1/2020
JP 2021507861 A 2/2021
KR 1020190068572 A 6/2019

OTHER PUBLICATIONS

Chinese Patent Office, First Office Action and search report issued on Oct. 31, 2022 for counterpart Chinese patent application No. 202210227883.4 with machine EN translation downloaded from EPO (12 pages).
Chinese Patent Office, Supplemental search report issued on Dec. 6, 2022 for counterpart Chinese patent application No. 202210227883.4 with machine EN translation (4 pages).
International search report issued for counterpart Chinese patent application No. PCT/CN2023/080255 mailed on Jun. 15, 2023 (3 pages).
First Office Action issued for corresponding Japanese Patent Application 2024-553501 mailed on Jul. 29, 2025.
First Office Action issued on May 15, 2026 for counterpart Korean patent application No. 10-2024-7033079, along with the English translation.

* cited by examiner

COMPOSITE MULTIFUNCTIONAL GLASS AND VEHICLE GLASS

CROSS-REFERENCE TO RELATED APPLICATIONS

This application is a National Stage of International Application No. PCT/CN2023/080255, filed on March 8; 2023, and entitled "Composite Multifunctional Glass and Vehicle Glass", which claims priority to Chinese Patent Application No. 2022102278834, entitled "Composite Multifunctional Glass and Vehicle Glass", filed on Mar. 8, 2022, and Chinese Patent Application No. 202220502660X, entitled "Composite Multifunctional Glass and Vehicle Glass", filed on Mar. 8, 2022 to China National Intellectual Property Administration, all of which are incorporated herein by reference in their entireties.

TECHNICAL FIELD

The present invention relates to the field of glass manufacturing, in particular to a composite multifunctional glass and a vehicle glass.

BACKGROUND ART

A composite multifunctional glass product is a multifunctional laminated glass product formed by adding a composite multifunctional material layer intercalated between layers of a glass product.

Most existing composite multifunctional materials have different thicknesss and are present in the form with flat surfaces. When sandwiched with double-curved glass panes or planar glass panes, the flat surface in particular cannot be completely fitted to the double-curved surface, the sandwiched composite multifunctional material will have a certain degree of wrinkles or wavy lines, and even a problem of cracking at the edge of the glass product due to a stress difference may occur.

SUMMARY OF THE INVENTION

An object of the present invention is to provide a composite multifunctional glass and a vehicle glass, so as to solve the problem of wrinkles or wavy lines when a flat composite multifunctional material is sandwiched between double-curved or planar glass panes, as well as the problem of cracking due to a stress difference at the edge of a glass product including a composite multifunctional layer.

In order to achieve the above object, the present invention adopts the following technical solutions.

In a first aspect of the present invention, provided is a composite multifunctional glass, comprising a first glass pane, a first adhesive film layer, a composite multifunctional combination layer, a third adhesive film layer, and a second glass pane laminated in this order;

the composite multifunctional combination layer has an area smaller than that of the composite multifunctional glass, and has a vacancy formed around the entire periphery thereof, which has a thickness consistent or substantially consistent with the thickness of the composite multifunctional combination layer; a second adhesive film layer is provided in the vacancy adjacent to the peripheral cut surface of the composite multifunctional combination layer; and the second adhesive film layer has one surface in contact with the third adhesive film layer, and a gap is formed between the other surface thereof and the first adhesive film layer.

In the composite multifunctional glass, the thickness of the composite multifunctional composite layer is greater than that of the second adhesive film layer. During the thermal and high-pressure processing of the composite multifunctional glass product, the first adhesive film layer can be directly pressed against the contacting surface of the composite multifunctional combination layer, so as to smooth out the wrinkles or wavy lines appearing in the composite multifunctional combination layer. Specifically, during the subsequent production, the composite multifunctional combination layer is expanded in all directions through degassing under the negative pressure effect upon vacuuming, and at the same time, the negative pressure enables the first adhesive film layer to be directly pressed against the contacting surface of the composite multifunctional combination layer, such that the wrinkles or wavy lines appearing in the composite multifunctional combination layer are smoothed out. Subsequently, in conjunction with the thermal process, high pressure process and other processes, the flowing characteristics of the first adhesive film layer allow it to fill the gap between the first adhesive film layer and the second adhesive film layer to form a qualified final product.

The composite multifunctional combination layer described in the present invention refers to one or more functional elements or a layered structure including one or more functional elements. Preferably, the composite multifunctional combination layer is an optical functional element, a photovoltaic component, an antenna communication device, a solar power generation device with a solar cell (silicon-, compound-, organic-based, etc.), or the like, and the optical functional element is selected from, but not limited to, one or more of PDLC (polymer dispersed liquid crystal), GHLC (guest-host effect liquid crystal), EC (electrochromic device), SPD (suspended particle device), LC, LED, a heat insulation film, a color changing film, a light guide film, a display film, or the like.

According to the composite multifunctional glass provided in the first aspect of the present invention, preferably, the area S1 of the composite multifunctional combination layer is 0.6-0.9 times the area S2 of the composite multifunctional glass, that is, $0.6S2 \leq S1 \leq 0.9S2$.

According to the composite multifunctional glass provided in the first aspect of the present invention, preferably, the relationship between the thickness H of the composite multifunctional combination layer and the thickness H3 of the second adhesive film layer is: $0.7H \leq H3 < H$.

According to the composite multifunctional glass provided in the first aspect of the present invention, preferably, the relationship between the thickness H of the composite multifunctional combination layer and the thickness H3 of the second adhesive film layer is: $0.7H \leq H3 < 0.8H$.

According to the composite multifunctional glass provided in the first aspect of the present invention, preferably, the composite multifunctional composite layer has a thickness H satisfying $0.1\ \text{mm} \leq H \leq 1.2\ \text{mm}$.

According to the composite multifunctional glass provided in the first aspect of the present invention, the height H2 of the gap is equal to the thickness difference between the thickness H of the composite multifunctional combination layer and the thickness H3 of the second adhesive film layer.

According to the composite multifunctional glass provided in the first aspect of the present invention, preferably, the relationship between the thickness H1 of the first adhesive film layer and the thickness of the composite multifunctional combination layer is: 1.3H3≤H1≤2H3.

According to the composite multifunctional glass provided in the first aspect of the present invention, preferably, the first glass pane and the second glass pane are independently selected from a monolithic glass pane or a laminated glass pane, composed of organic glass or inorganic glass.

According to the composite multifunctional glass provided in the first aspect of the present invention, preferably, the first glass pane and the second glass pane are used as two surface layers of the composite multifunctional glass product, and may be planar glass panes or double-curved glass panes. More preferably, the double-curved glass panes have a radius of curvature of ≥2,200 mm.

According to the composite multifunctional glass provided in the first aspect of the present invention, preferably, the first adhesive film layer, the second adhesive film layer, and the third adhesive film layer are independently an adhesive film layer formed from PVB (polyvinyl butyral), EVA (ethylene-vinyl acetate copolymer), PU (polyurethane) and the like.

According to the composite multifunctional glass provided in the first aspect of the present invention, in the laminating process, there is a gap between the first adhesive film layer and the second adhesive film layer (with a height H2), such that the first adhesive film layer is not supported by the second adhesive film layer at the edge during the laminating process, and the composite multifunctional material layer can be squeezed, which favors better spreading of the composite multifunctional material layer, so as to avoid the occurrence of wrinkle or wave phenomena on the double-curved glass panes, thereby increasing the yield of finished products. In addition, the laminating process of the composite multifunctional glass is the same as the conventional processes, and is simple and easy to operate.

In a second aspect of the present invention, provided is a composite multifunctional glass, comprising a first glass pane, a first adhesive film layer, a composite multifunctional combination layer, a third adhesive film layer, and a second glass pane laminated in this order;

- the composite multifunctional combination layer has an area S1 that is smaller than the area S2 of the composite multifunctional glass, and has a vacancy formed around the entire periphery thereof, which has a thickness consistent or substantially consistent with the thickness H of the composite multifunctional combination layer; a second adhesive film layer with a thickness H3 is provided in the vacancy adjacent to the peripheral cut surface of the composite multifunctional combination layer;
- when S1/S2≤0.5 and/or H<0.15 mm, H3=0; and
- when 0.5<S1/S2<0.98 and H≥0.15 mm, 0<H3≤H (S1/S2+0.2).

In a preferred embodiment, when 0.5<S1/S2<0.98 and H≥0.15 mm, the thickness of the second adhesive film layer further satisfies H3<H, and at this time the second adhesive film layer has one surface in contact with the third adhesive film layer, and a gap is formed between the other surface thereof and the first adhesive film layer. The height H2 of the gap is equal to the difference between the thickness H of the composite multifunctional combination layer and the thickness H3 of the second adhesive film layer.

In a preferred embodiment, the thickness of the composite multifunctional composite layer is greater than that of the second adhesive film layer. During the thermal and high-pressure processing of the composite multifunctional glass product, the first adhesive film layer can be directly pressed against the contacting surface of the composite multifunctional combination layer, so as to smooth out the wrinkles or wavy lines appearing in the composite multifunctional combination layer. Specifically, during the subsequent production, the composite multifunctional combination layer is expanded in all directions through degassing under the negative pressure effect upon vacuuming, and at the same time the negative pressure enables the first adhesive film layer to be directly pressed against the contacting surface of the composite multifunctional combination layer, such that the wrinkles or wavy lines appearing in the composite multifunctional combination layer are smoothed out. Subsequently, through the thermal process, high pressure process and other processes, the flowing characteristics of the first adhesive film layer allow it to fill the gap between the first adhesive film layer and the second adhesive film layer to form a qualified final product.

In another preferred embodiment, when 0.5<S1/S2<0.98 and H≥0.15 mm, the second adhesive film layer has a thickness H3=H; that is, the second adhesive film layer is disposed equally in thickness and level with the composite multifunctional combination layer. The second adhesive film layer is located around the periphery of the composite multifunctional combination layer and completely fills the vacant area around the composite multifunctional combination layer relative to the composite multifunctional glass product.

In a preferred embodiment, when 0.5<S1/S2<0.98 and H≥0.15 mm, the thickness H3 of the second adhesive film layer further satisfies H3>H, and at this time, a cavity is formed between the composite multifunctional combination layer and the first adhesive film layer. The height H2' of the cavity is equal to the difference between the thickness H3 of the second adhesive film layer and the thickness H of the composite multifunctional combination layer.

In this preferred embodiment, the formation of the cavity allows the composite multifunctional layer after lamination to have a space for extension during external vacuuming and external pressurization of the glass product. This reduces the appearance of wrinkles or wavy lines, and also reduces the risk of cracking due to the stress difference at the edge of the composite multifunctional glass product.

According to the composite multifunctional glass provided in the second aspect of the present invention, preferably, the thickness H of the composite multifunctional composite layer satisfies 0.08 mm≤H≤1.2 mm.

According to the composite multifunctional glass provided in the second aspect of the present invention, preferably, the first adhesive film layer has a thickness of 0.38 mm to 0.76 mm, more preferably 0.76 mm.

According to the composite multifunctional glass provided in the second aspect of the present invention, preferably, the third adhesive film layer has a thickness of 0.38 mm to 0.76 mm, more preferably 0.38 mm.

According to the composite multifunctional glass provided in the second aspect of the present invention, preferably, the first glass pane and the second glass pane are independently selected from a monolithic glass pane or a laminated glass pane, composed of organic glass or inorganic glass.

According to the composite multifunctional glass provided in the second aspect of the present invention, preferably, the first glass pane and the second glass pane are used as two surface layers of the composite multifunctional glass product, and may be planar glass panes or double-curved glass panes. More preferably, the double-curved glass panes have a radius of curvature of ≥2,200 mm.

According to the composite multifunctional glass provided in the second aspect of the present invention, preferably, the first adhesive film layer, the second adhesive film layer, and the third adhesive film layer are independently an adhesive film layer formed from PVB (polyvinyl butyral), EVA (ethylene-vinyl acetate copolymer), PU (polyurethane) and the like.

In a third aspect of the present invention, provided is a vehicle glass comprising the composite multifunctional glass provided in the first aspect or the second aspect, for example, a front window glass, a rear window glass, a side window glass, a sunroof glass or the like.

In the composite multifunctional glass provided in the second aspect of the present invention, in the laminating process, the thickness of the second adhesive film layer is determined by the thickness H of the composite multifunctional layer and the proportional relationship between the area S1 of the composite multifunctional layer and the area S2 of the composite multifunctional glass product. By choosing the thickness H3 of the second adhesive film layer, problems can be solved by the following advantages:

(1) When $H<0.15$ mm and/or $S1/S2\leq0.5$, $H3<H$, $H3=0$, in the laminating process, a vacancy with a height that is consistent or substantially consistent with H is formed between the first adhesive film layer and the second adhesive film layer, such that the first adhesive film layer is not supported by the second adhesive film layer at the edge in the laminating process, and the composite multifunctional material layer can be squeezed, which favors better spreading of the composite multifunctional material layer to avoid the occurrence of wrinkle or wave phenomena in the double-curved glass panes.

(2) When $0.5<S1/S2<0.98$ and $H\geq0.15$ mm, the thickness H3 of the second adhesive film layer, H, S1 and S2 satisfy the following relationship: $0<H3\leq H\ (S1/S2+0.2)$. When $H3<H$, a gap with a height H2 is formed between the first adhesive film layer and the second adhesive film layer. In the thermal process, the first adhesive film layer is in contact with and pressed against the composite multifunctional combination layer, such that the wrinkles or wavy lines of the composite multifunctional combination layer that may occur in a curved product are smoothed out. Also, in the thermal process, high pressure process and other processes, the flowing characteristics of the first adhesive film layer and the third adhesive film layer allow them to fill the gap between the first adhesive film layer and the second adhesive film layer, and a qualified final product is formed.

(3) When $0.5<S1/S2<0.98$ and $H\geq0.15$ mm, the thickness H3 of the second adhesive film layer, H, S1 and S2 satisfy the following relationship: $0<H3\leq H\ (S1/S2+0.2)$. When $H3=H$, there is no gap between the first adhesive film layer and the second adhesive film layer. When the edge of the composite multifunctional combination layer is close to the edge of the glass product, with the influence of the glass stress, the glass product is subjected to external pressure during the processing. This approach solves the problem of highly susceptible cracking at the edge positions along the composite multifunctional layer.

(4) When $0.5<S1/S2<0.98$ and $H\geq0.15$ mm, the thickness H3 of the second adhesive film layer, H, S1 and S2 satisfy the following relationship: $0<H3\leq H(S1/S2+0.2)$. When $H3>H$, a cavity with a height H2' is formed between the composite multifunctional layer and the first adhesive film layer. The formation of the cavity allows the composite multifunctional layer after lamination to have a space for extension during the external vacuuming and external pressurization of the glass product, which reduces the appearance of wrinkle or wave phenomena and also reduces the risk of cracking due to the stress difference at the edge of the composite multifunctional glass product.

The present invention can well solve the wrinkle or wave phenomena currently occurred frequently upon laminating a composite multifunctional layer between double-curved glass panes, improve the total yield of finished products, and solve the problem of edge cracking appearing in glass products having a composite multifunctional layer.

BRIEF DESCRIPTION OF THE DRAWINGS

The drawings described herein are for illustrative purposes only and are not intended to limit the scope of the present invention in any way. In addition, the shapes and scale sizes of the components in the drawings are merely illustrative and are used to help understand the present invention, and do not specifically limit the shapes and scale sizes of the components of the present invention. In light of the teaching of the present invention, a person skilled in the art may select various possible shapes and scale sizes according to specific situations to implement the present invention.

REFERENCE SIGNS

Figure 1:
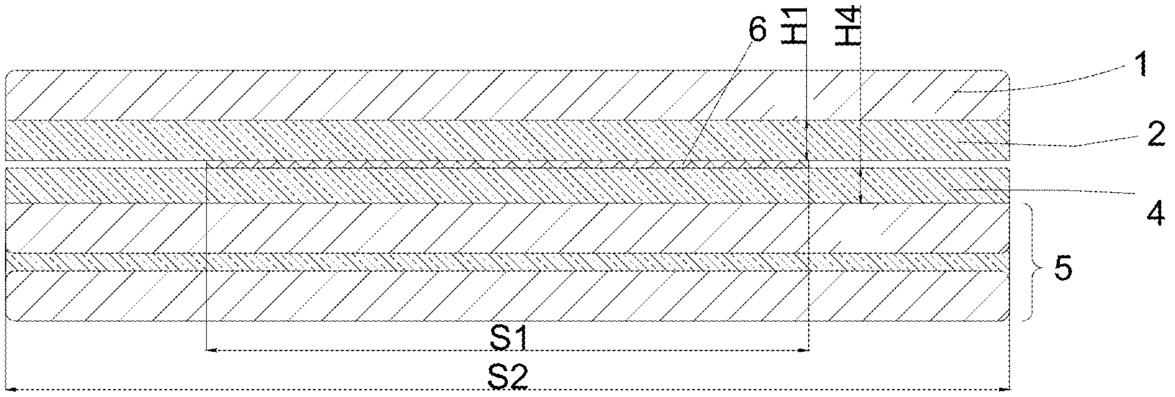
FIG. 1 is a schematic cross-sectional view of the composite multifunctional glass in Example 3.

1: first glass pane;
2: first adhesive film layer;
3: second adhesive film layer;
4: third adhesive film layer;
5: second glass pane;
6: composite multifunctional combination layer;
S1: the area of the composite multifunctional combination layer 6;
S2: the area of the composite multifunctional glass;
H: the thickness of the composite multifunctional material layer 6;
H1: the thickness of the first adhesive film layer 2;
H2: the height of the gap between the first adhesive film layer 2 and the second adhesive film layer 3;
H2': the height of the cavity between the first adhesive film layer 2 and the composite multifunctional combination layer 6;
H3: the thickness of the second adhesive film layer 3;
H4: the thickness of the third adhesive film layer 4.

DETAILED DESCRIPTION OF THE INVENTION

In order to describe the present invention more clearly, the present invention will be further described below with reference to preferred examples and the accompanying drawings. Like parts in the drawings are designated with the same reference numerals. A person skilled in the art should understand that the content specifically described below is illustrative and not restrictive, and should not limit the protection scope of the present invention.

In addition, the meanings of some orientation words, such as "upper" and "lower", mentioned in the examples of the present invention are related to the placement of the composite multifunctional glass, and should not be construed as limiting the protection scope of the present invention.

Example 1

Figure 2:
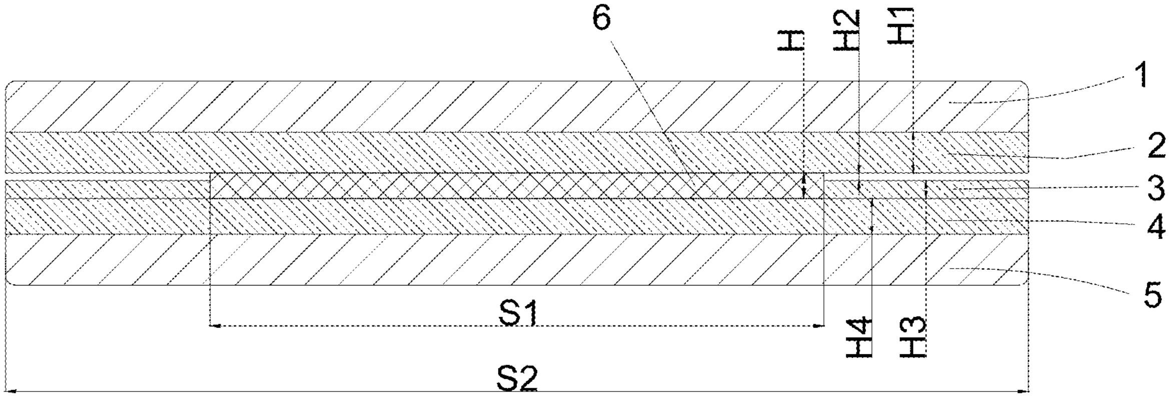
FIG. 2 is a schematic cross-sectional view of the composite multifunctional glass in Examples 1 and 4.
Figure 3:
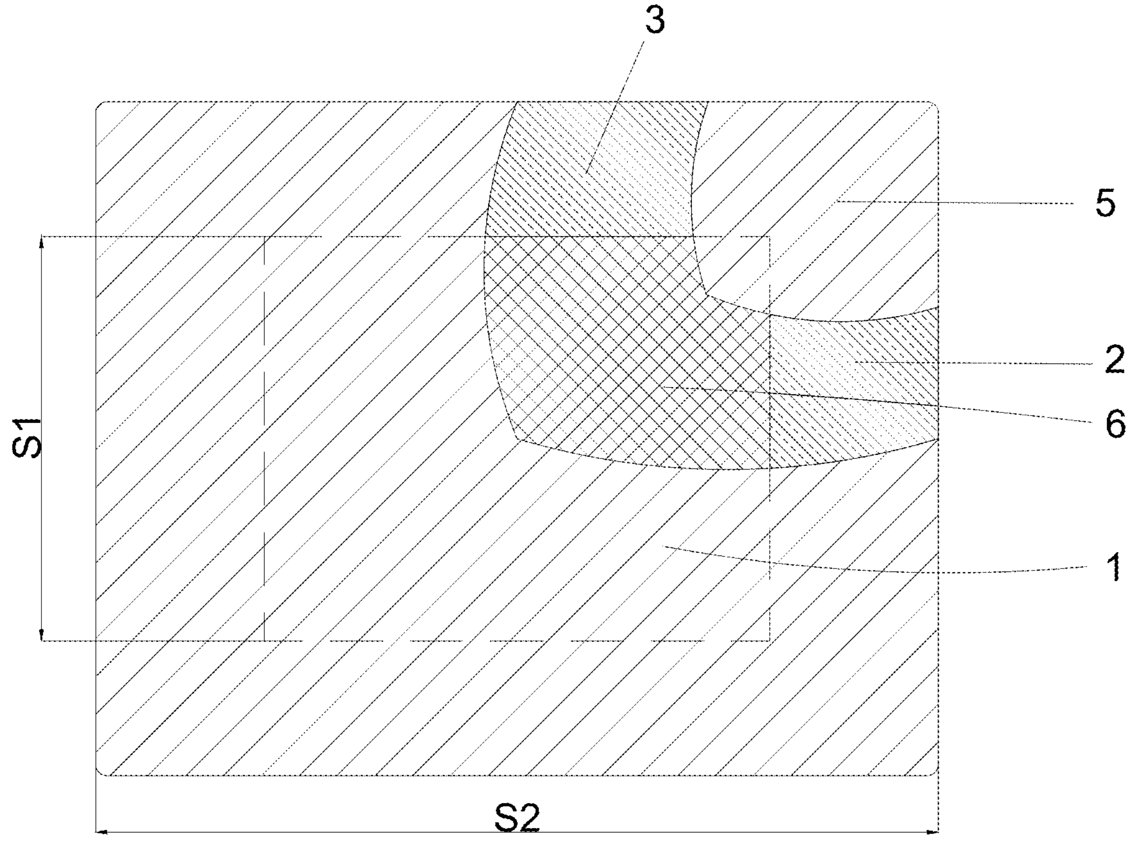
FIG. 3 is a schematic planar view of the composite multifunctional glass in Examples 1 and 4.

As shown in FIGS. 2 and 3, a composite multifunctional glass comprises a first glass pane 1, a first adhesive film layer 2, a composite multifunctional combination layer 6, a third adhesive film layer 4, and a second glass pane 5 which are sequentially laminated from top to bottom.

The composite multifunctional combination layer 6 has an area S1 that is smaller than the area S2 of the composite multifunctional glass, and has a vacancy formed all around its periphery that is consistent or substantially consistent with its thickness; a second adhesive film layer 3 is provided in the vacancy adjacent to the peripheral cut surface of the composite multifunctional combination layer 6; and the second adhesive film layer 3 has one surface in contact with the third adhesive film layer 4, and a gap is formed between the other surface thereof and the first adhesive film layer 2. The second adhesive film layer 3 has a width consistent with the width of the vacancy (i.e., the vacancy is filled in the planar dimension as shown in FIG. 3), but has a thickness smaller than the height of the vacancy. A gap with the height H2 is formed between the second adhesive film layer 3 and the first adhesive film layer 2, and the height H2 of the gap is the height difference between the thickness H of the composite multifunctional combination layer 6 and the thickness H3 of the second adhesive film layer 3. Due to the existence of the height difference H2, the first adhesive film layer 2 is not supported by the second adhesive film layer 3 at the edge in the laminating process, and the composite multifunctional material layer 6 can be squeezed, which favors better spreading of the composite multifunctional material layer 6, so as to avoid the occurrence of wrinkle or wave phenomena in the double-curved glass panes, thereby increasing the yield of finished products.

Specifically, in this example, both the first glass pane 1 and the second glass pane 5 are monolithic glass panes composed of organic glass or inorganic glass, and are double-curved glass with a double curvature of 2,800 mm. The first adhesive film layer 2, the second adhesive film layer 3, and the third adhesive film layer 4 are each an adhesive film layer formed of PVB (polyvinyl butyral).

The thickness H1 of the first adhesive film layer 2 is 0.76 mm; the thickness H3 of the second adhesive film layer 3 is 0.5 mm; the thickness of the third adhesive film layer 4 is 0.38 mm; the thickness H of the composite multifunctional material layer 6 is 0.7 mm; and the height H2 of the gap between the first adhesive film layer 2 and the second adhesive film layer 3 is 0.2 mm. The area (S1) of the composite multifunctional combination layer 6 is 0.6 times the area (S2) of the composite multifunctional glass.

Example 2

Figure 5:
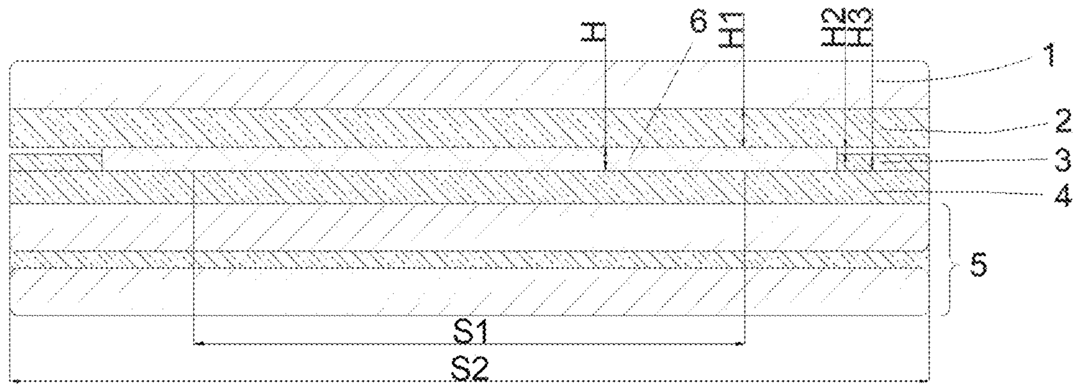
FIG. 5 is a schematic cross-sectional view of the composite multifunctional glass in Example 2.

As shown in FIG. 5, the differences between the composite multifunctional glass in this example and that in Example include:

The first glass pane 1 is a monolithic glass pane composed of organic glass or inorganic glass, and the second glass layer 5 is a double-layer laminated glass pane. Both the first glass pane 1 and the second glass layer 5 are double-curved glass with a double curvature of 3,000 mm. In addition, the first glass pane 1 may also be a double-layer laminated glass pane.

The first adhesive film layer 2, the second adhesive film layer 3, and the third adhesive film layer 4 are each an adhesive film layer formed of EVA (ethylene-vinyl acetate copolymer).

The thickness H1 of the first adhesive film layer 2 is 1.14 mm; the thickness H3 of the second adhesive film layer 3 is 0.76 mm; the thickness of the third adhesive film layer 4 is 0.38 mm; the thickness H of the composite multifunctional material layer 6 is 1.0 mm; and the height H2 of the gap between the first adhesive film layer 2 and the second adhesive film layer 3 is 0.24 mm. The area (S1) of the composite multifunctional combination layer 6 is 0.8 times the area (S2) of the composite multifunctional glass.

Example 3

As shown in FIG. 1, a composite multifunctional glass comprises a first glass pane 1, a first adhesive film layer 2, a composite multifunctional combination layer 6, a third adhesive film layer 4, and a second glass pane 5 which are sequentially laminated from top to bottom. The composite multifunctional combination layer 6 has an area S1 that is smaller than the area S2 of the composite multifunctional glass, and has a vacancy formed all around its periphery that is consistent or substantially consistent with its thickness H.

S1/S2=0.4, which satisfies S1/S2≤0.5, and a second adhesive film layer 3 is not provided. The thickness H of the composite multifunctional combination layer 6 is 0.1 mm; the thickness H1 of the first adhesive film layer 2 is 0.76 mm; and the height of vacancy around the composite multifunctional combination layer 6 is 0.1 mm.

The composite multifunctional glass product has a double curvature of 3,000 mm. The first adhesive film layer 2 can be directly pressed against the contacting surface of the composite multifunctional combination layer 6, such that the wrinkles or wavy lines appearing in the composite multifunctional combination layer 6 are smoothed out. During the thermal and high pressure processing of the composite multifunctional glass pane product, the flowing characteristics of the first adhesive film layer 2 and the third adhesive film layer 4 allow them to fill the vacancy.

In this example, the first glass pane 1 is a monolithic glass pane composed of organic glass or inorganic glass, and the second glass pane 5 is a double-layer laminated glass pane. Both the first glass pane 1 and the second glass pane 5 are double-curved glass with a double curvature of 3,000 mm. The first adhesive film layer 2, the second adhesive film layer 3, and the third adhesive film layer 4 are each an adhesive film layer formed of PVB (polyvinyl butyral).

Example 4

As shown in FIGS. 2 and 3, a composite multifunctional glass comprises a first glass pane 1, a first adhesive film layer 2, a composite multifunctional combination layer 6, a third adhesive film layer 4, and a second glass pane 5 which are sequentially laminated from top to bottom.

The composite multifunctional combination layer 6 has an area S1 that is smaller than the area S2 of the composite multifunctional glass, and has a vacancy formed all around its periphery that is consistent or substantially consistent with its thickness H.

Here, S1/S2=0.6; the thickness H of the composite multifunctional combination layer 6 is 1.0 mm; the thickness H1 of the first adhesive film layer 2 is 0.76 mm; and the thickness H4 of the third adhesive film layer 4 is 0.76 mm.

$0.5<S1/S2<0.98$ and $H\geq 0.15$ mm are satisfied, and a second adhesive film layer 3 with a height H3 is provided within the vacancy adjacent to the peripheral cut surface of the composite multifunctional combination layer 6; and the second adhesive film layer 3 has one surface in contact with the third adhesive film layer 4, and a gap with a height H2 is formed between the other surface thereof and the first adhesive film layer 2. The second adhesive film layer 3 has a width consistent with the width of the vacancy (i.e., the vacancy is filled in the planar dimension as shown in FIG. 3).

At this time, $0<H3\leq H(S1/S2+0.2)$, and $H3\leq 0.8$ mm. When H3=0.8 mm, the height of the gap between the first adhesive film layer 2 and the second adhesive film layer 3 is $H2=H-H3$; that is, H2=1.0 mm-0.8 mm=0.2 mm.

The composite multifunctional glass product has a double curvature of 2,800 mm. The second adhesive film layer 3 is located at the periphery of the composite multifunctional combination layer 6 and serves to fill the vacant area around the composite multifunctional combination layer 6 relative to the composite multifunctional glass product. After the lamination, a gap with a height H2 is formed. In the thermal processing, the first adhesive film layer 2 is contacted with and pressed against the composite multifunctional combination layer 6, such that the wrinkles or wavy lines of the composite multifunctional combination layer 6 that may occur in the curved product are smoothed out. At the same time, as in thermal process, high pressure process and other processes, the flowing characteristics of the first adhesive film layer 2 and the third adhesive film layer 4 allow them to fill the gap between the first adhesive film layer 2 and the second adhesive film layer 3, a qualified final product is formed.

In this example, both the first glass pane 1 and the second glass pane 5 are monolithic glass panes composed of organic glass or inorganic glass, and are double-curved glass with a double curvature of 2,800 mm. The first adhesive film layer 2, the second adhesive film layer 3, and the third adhesive film layer 4 are each an adhesive film layer formed of PVB (polyvinyl butyral).

Example 5

The differences between the composite multifunctional glass in this example and that in Example 2 include:

S1/S2=0.9; the thickness H of the composite multifunctional combination layer 6 is 0.9 mm; the thickness H1 of the first adhesive film layer 2 is 0.76 mm; and the thickness H4 of the third adhesive film layer 4 is 0.38 mm.

$0.5<S1/S2<0.98$ and $H\geq 0.15$ mm are satisfied. The thickness H3 of the second adhesive film layer satisfies: $0<H3\leq H(S1/S2+0.2)$, and $H3\leq 0.99$ mm, preferably H3=0.9 mm; the height H2 of the gap between the first adhesive film layer 2 and the second adhesive film layer 3 is thus 0 mm; that is, the thickness of the second adhesive film layer is equal to that of the composite multifunctional combination layer 6.

The composite multifunctional glass product has a double curvature of 3,300 mm. The second adhesive film layer 3 is located around the periphery of the composite multifunctional combination layer 6 to completely fill the vacant area around the composite multifunctional combination layer 6 relative to the composite multifunctional glass product.

Example 6

Figure 4:
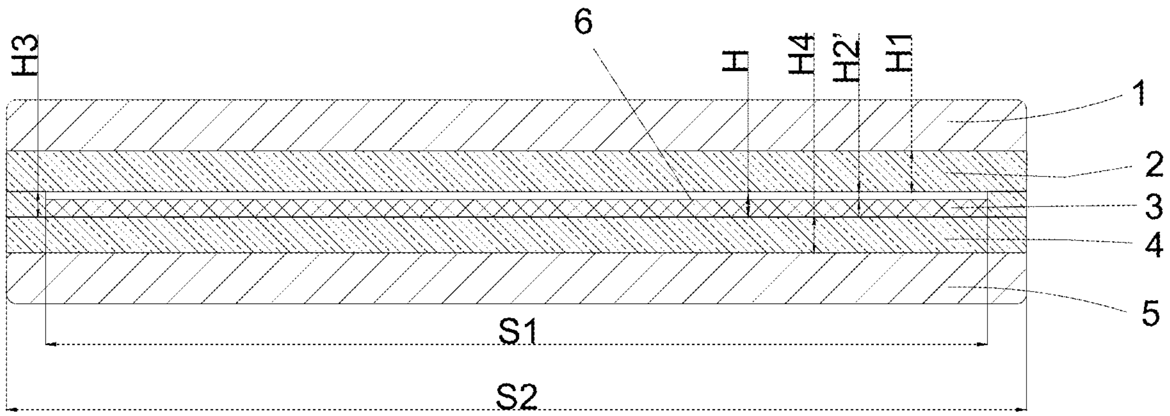
FIG. 4 is a schematic cross-sectional view of the composite multifunctional glass in Example 5.

As shown in FIG. 4, a composite multifunctional glass comprises a first glass pane 1, a first adhesive film layer 2, a composite multifunctional combination layer 6, a third adhesive film layer 4, and a second glass pane 5 which are sequentially laminated from top to bottom.

The composite multifunctional combination layer 6 has an area S1 that is smaller than the area S2 of the composite multifunctional glass, and has a vacancy formed all around its periphery that is consistent or substantially consistent with its thickness H.

Herein, S1/S2=0.9; the thickness H of the composite multifunctional combination layer 6 is 1.0 mm; the thickness H1 of the first adhesive film layer 2 is 0.76 mm; and the thickness H4 of the third adhesive film layer 4 is 0.38 mm.

$0.5<S1/S2<0.98$ and $H\geq 0.15$ mm are satisfied, and a second adhesive film layer 3 with a height H3 is provided in the vacancy adjacent to the peripheral cut surface of the composite multifunctional combination layer 6.

The thickness H3 of the second adhesive film layer satisfies: $0<H3\leq H(S1/S2+0.2)$, and $H3\leq 1.1$ mm, preferably H3=1.1 mm. At this time, a cavity with a height H2' of 0.1 mm is formed between the composite multifunctional combination layer 6 and the first adhesive film layer 2.

The composite multifunctional glass product has a double curvature of 3,500 mm. The second adhesive film layer 3 is located around the periphery of the composite multifunctional combination layer 6 and serves to fill the vacant area around the composite multifunctional combination layer 6 relative to the composite multifunctional glass product; wherein the second adhesive film layer has a thickness $H3>H$, and a cavity of 0.1 $mm^2$ is formed between the composite multifunctional combination layer 6 and the first adhesive film layer 2. The formation of the cavity allows the composite multifunctional layer after lamination to have a space for extension during the external vacuuming and external pressurization of the glass product. This reduces the appearance of wrinkles or wavy lines, and also reduces the risk of cracking due to the stress difference at the edge of the composite multifunctional glass product.

Obviously, the above examples of the present invention are merely examples for the purpose of clearly illustrating the present invention, and are not intended to limit the embodiments of the present invention. For a person of ordinary skill in the related field, in view of the above description, possible changes or variations in different forms can be made, while it is not possible to exhaustively describe all the embodiments herein. All the obvious changes or variations derived from the technical solutions of the present invention are also encompassed within the protection scope of the present invention.

What is claimed is:

1. A composite multifunctional glass, comprising a first glass pane, a first adhesive film layer, a composite multifunctional combination layer, a third adhesive film layer, and a second glass pane laminated in this order;

wherein the composite multifunctional combination layer has an area smaller than that of the composite multifunctional glass, and a vacancy is formed around the entire periphery of the composite multifunctional combination layer; in the vacancy, a second adhesive film layer is provided adjacent to a peripheral cut surface of the composite multifunctional combination layer; one surface of the second adhesive film layer is in contact with the third adhesive film layer, and a gap is formed between the other surface of the second adhesive film layer and the first adhesive film layer;

wherein a thickness H1 of the first adhesive film layer and a thickness H3 of the second adhesive film layer satisfy: $1.3H3\leq H1\leq 2H3$.

2. The composite multifunctional glass according to claim 1, wherein the area of the composite multifunctional combination layer is 0.6-0.9 times the area of the composite multifunctional glass.

3. The composite multifunctional glass according to claim 1, wherein a thickness H of the composite multifunctional combination layer and the thickness H3 of the second adhesive film layer satisfy: $0.7H \leq H3 < H$.

4. The composite multifunctional glass according to claim 1, the thickness H of the composite multifunctional combination layer and the thickness H3 of the second adhesive film layer satisfy: $0.7H \leq H3 < 0.8H$.

5. The composite multifunctional glass according to claim 3, wherein the composite multifunctional composite layer has a thickness H satisfying: 0.1 mm≤H≤1.2 mm.

6. The composite multifunctional glass according to claim 1, wherein the first glass pane and the second glass pane are planar glass panes or double-curved glass panes.

7. The composite multifunctional glass according to claim 6, wherein the double-curved glass panes have a radius of curvature of ≥2,200 mm.

8. The composite multifunctional glass according to claim 1, wherein the composite multifunctional combination layer is an optical functional element.

9. A composite multifunctional glass, comprising a first glass pane, a first adhesive film layer, a composite multifunctional combination layer, a third adhesive film layer, and a second glass pane laminated in this order;

wherein the composite multifunctional combination layer has an area S1 which is smaller than the area S2 of the composite multifunctional glass, and a vacancy is formed around the entire periphery of the composite multifunctional combination layer; in the vacancy, a second adhesive film layer having a thickness H3 is provided adjacent to a peripheral cut surface of the composite multifunctional combination layer;

when $0.5 < S1/S2 < 0.98$ and H≥0.15 mm, $0 < H3 \leq H\,(S1/S2+0.2)$, the thickness H3 of the second adhesive film layer further satisfies $H3 > H$, and a cavity is formed between the composite multifunctional combination layer and the first adhesive film layer, wherein His a thickness of the composite multifunctional combination layer; and wherein the thickness H1 of the first adhesive film layer and the thickness H3 of the second adhesive film layer satisfy: $1.3H3 \leq H1 \leq 2H3$.

10. The composite multifunctional glass according to claim 9, wherein the thickness H of the composite multifunctional composite layer satisfies 0.15 mm≤H≤1.2 mm.

11. The composite multifunctional glass according to claim 9, wherein the first adhesive film layer has a thickness of 0.38 mm to 0.76 mm.

12. The composite multifunctional glass according to claim 9, wherein the third adhesive film layer has a thickness of 0.38 mm to 0.76 mm.

13. The composite multifunctional glass according to claim 9, wherein the first glass pane and the second glass pane are planar glass panes or double-curved glass panes; and the double-curved glass panes have a radius of curvature of ≥2,200 mm.

14. The composite multifunctional glass according to claim 9, wherein the composite multifunctional combination layer is an optical functional element.

15. A vehicle glass comprising the composite multifunctional glass according to claim 1.

* * * * *